Figure 1:
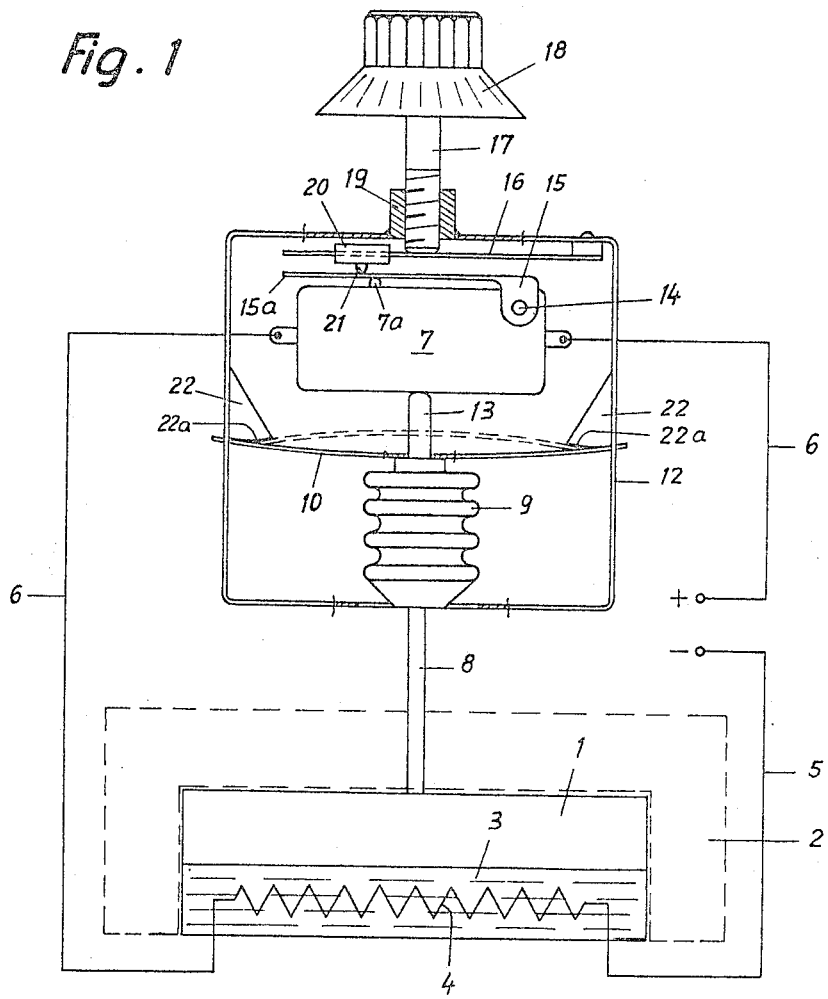

Sept. 13, 1966 W. BRANDL 3,272,942
CONTROL SWITCH FOR AN ELECTRICAL HEATING APPLIANCE
Filed April 3, 1964 2 Sheets-Sheet 1

INVENTOR:
W. Brandl
BY
Richards Geier
ATTORNEYS

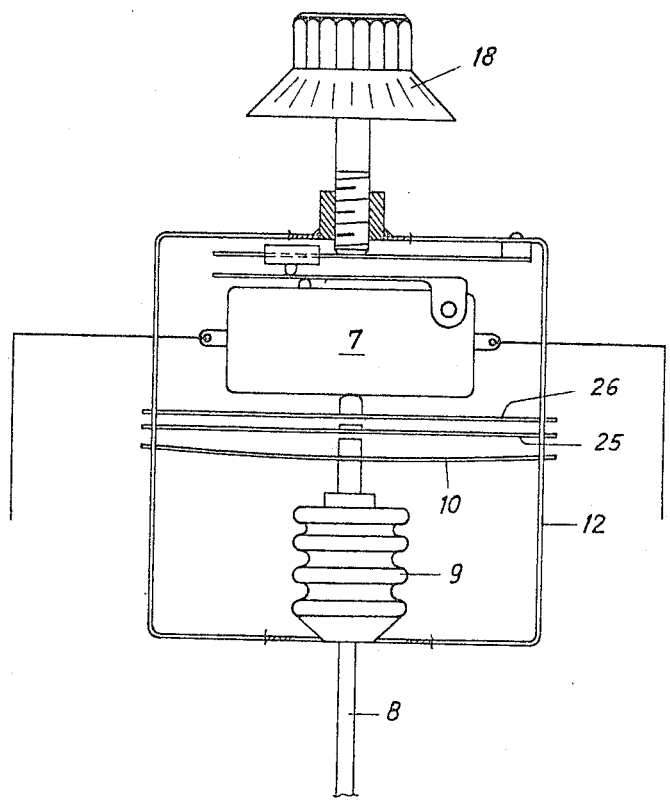

United States Patent Office 3,272,942
Patented Sept. 13, 1966

3,272,942
CONTROL SWITCH FOR AN ELECTRICAL
HEATING APPLIANCE
Wilhelm Brandl, 12 Schurbungert, Zurich, Switzerland
Filed Apr. 3, 1964, Ser. No. 357,159
Claims priority, application Switzerland, Apr. 5, 1963,
4,414/63
2 Claims. (Cl. 200—122)

This invention relates to a control device for an electric heating apparatus which is constructed as an evacuated hollow body partly filled with liquid wherein an electric heating coil is provided for evaporating the liquid and whose interior is connected with a resilient member, which is deformed elastically in accordance with the pressure prevailing in the interior of said hollow body and is in operative connection with a switch member, that switches the current supply to the heating coil on and off.

In such known heating appliances liquids of suitable boiling points are used. For temperature ranges from 30° C. to about 200° C. water is the most suitable. Since the interior of the hollow body is evacuated as far as practically possible, this water evaporates at about 30° C., as soon as the heating coil is energised, and the heat of the water is transmitted through the walls of the hollow body to the medium to be heated. With increasing heating of the steam and pressure in the interior of the hollow body also rises, however not linearly with the temperature but in accordance with the steam pressure graph. This pressure is used for regulating the temperature of the heating appliance by acting on a resilient diaphragm or on a resilient bellows, which upon a predetermined deformation limited by a control knob actuates a switch, that interrupts the current supply to the heating coil. Experience has shown that the self-adjustment of the heating element to a certain temperature or to a certain pressure does not take place by a single interruption of the heating current but by a succession of switching on and off actions following one another at short time intervals.

In accordance with the steam pressure graph comparatively high temperature differences occur at comparatively small pressure differences in the low temperature ranges between about 30° C. and 60° C., while conversely at temperatures above about 80° C. rather large pressure differences correspond with comparatively small temperature differences. It is therefore difficult to provide a heating element which allows an accurate control of temperature over a large temperature range: When the resilient member is made comparatively easily yielding, so that the switch is actuated in the low temperature range at low pressure differences, an undesirably high cadence of switching operation occurs in the higher temperature range. When on the other hand the resilient member is made comparatively stiff, the temperature is controlled in the lower range but inaccurately.

The invention has for its primary object to overcome this disadvantage and to provide a control device for electric heating appliances which shows an accurate control and homogeneous cadence of switching over the whole temperature range when adjusting itself automatically to the temperature selected.

With this and other objects in view which will become apparent later from this specification and accompanying drawings, the present invention provides a control device for an electric heating appliance, comprising in combination: an evacuated hollow body partly filled with a liquid an electric heating coil arranged in said hollow body and serving for evaporating said liquid, a resilient member connected with the interior of said hollow body and being elastically deformed by the vapor pressure prevailing in the interior of said hollow body, an electric switch having an actuator knob arranged in the circuit of said electric heating coil and in operative connection with said resilient member, so as to be switched off and on depending on the degree of deformation thereof, and means influencing the spring characteristic of said resilient member in the sense of progressively stiffening the same with increasing pressure in the interior of said hollow body so as to adapt the spring characteristic of said resilient member to the vapor pressure-temperature graph.

Figure 2:
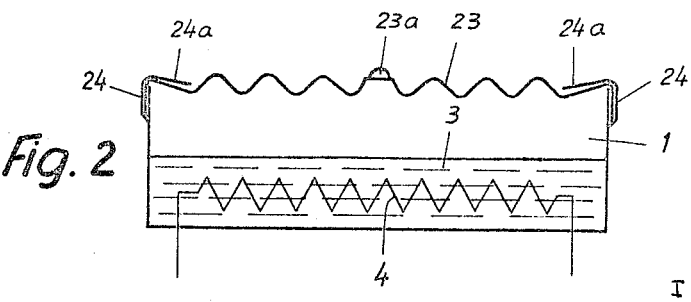

These and other features of my said invention will be clearly understood from the following description of three embodiments thereof given by way of example with reference to the accompanying drawings, in which:

FIG. 1 shows a first embodiment of a control device with a bellow-shaped resilient member and a supporting spring, FIG. 2 shows the hollow body of a heating appliance with a diaphragm and an abutment ring, and FIG. 3 shows a modification of the embodiment of FIG. 1 with several supporting springs.

FIG. 1 shows diagrammatically a hollow body 1 serving as the heating element, namely, which serves for the heating of a container 2 indicated by dotted lines. The hollow body 1 is evacuated and closed in an air tight manner. It is partly filled with a liquid 3, e.g. water, and contains also an electric heating coil 4, which is connected by conductors 5, 6 and a switch 7 with a source of current. The hollow body 1 is in communication by a pipe 8 with a metal bellows 9, to which a leaf spring 10 is attached, which rests at both ends on a frame 12. The bellows 9 with the spring 10 thus form a resilient system, which is deformed in accordance with the pressure prevailing in the hollow body 1. When the heating coil 4 is switched off and the liquid 3 is cold, the bellows 9 contracts due to the vacuum in the hollow body 1, and the spring 10 is in the position shown in full lines.

The bellows 9 carries a stem 13, which acts on the switch 7. The latter is mounted pivotally about a pin 14. A lever 15 is pivotally mounted on the pin 14 and has a tongue 15a which rests on the actuating knob 7a of the switch 7. A leaf spring 16 is attached at one end upon the frame 12. The leaf spring 16 carries a movable slider 20, which bears upon a cam on the tongue 15a. In a screw tapped sleeve 19 of the frame 12 a screw-threaded spindle 17 is screwed, which carries at its outer end a rotatable knob 18, on which a calibrated temperature scale is provided. The inner end of the spindle 17 rests on the leaf spring 16 and forces the same more or less strongly on the tongue 15a, depending on how far it had been screwed into the tapped sleeve 19.

On the frame 12 adjacent the ends of the leaf spring 10 moreover two guide cams 22 are arranged, which have curved abutments 22a for the leaf spring 10. They have the object of displacing the support points of the spring 10 after the same has deflected upward in consequence of the expansion of the bellows 9, i.e. to shorten the free span of the leaf spring 10 and thereby to stiffen the spring. The abutments 22a may be so shaped that the spring characteristic of the resilient system formed by the bellows 9 and spring 10 corresponds approximately to the vapour pressure graph of the liquid 3.

The manner of functioning of the device is as follows: when the heating coil 4 is energised, the water 3 evaporates already at about 30° C. owing to the evacuation of the hollow body 1, and heats the contents of the container 2. The desired temperature to which the contents of the container are to be heated is adjusted on the knob 18; so long as the contents of the container 2 are still cool, so much heat is withdrawn from the steam in the hollow body 1 that it does not attain the temperature adjusted on the knob 18 and the pressure corresponding to this temperature. When the temperature of the contents of the container 2 approaches the adjusted temperature the steam pressure in the hollow body 1 rises to the value corresponding to that temperature. The steam pressure has then expanded the bellows 9 to such an extent, that it applies a force to a switch which suffices for overcoming the switching-off force. The knob 7a is actuated and the switch 7 interrupts the supply of current to the heating coil 4. Since, however, heat is still transferred into the container 2, the steam pressure in the hollow body 1 drops and the current is swithced on again, until after repeated switching on and off the contents of the container 2 have the desired temperature and the current remains interrupted permanently, when owing to cooling off the temperature drops below the value adjusted to; thereafter reheating takes place.

By providing the cams 22 with curved abutment faces 22a for the leaf spring 10 the latter upon its deflection due to expansion of the bellows 9 applies to the bellows 9 a counter force increasing not linearly but progressively so that its spring characteristic corresponds approximately to the shape of the steam pressure graph of the liquid 3.

By shifting the slide 20 on the leaf spring 16 the switching path of the switch may be enlarged or shortened. When for example the cam 21 is directly opposite the actuator knob 7a, the angle through which the switch 7 has to be turned about the pin 14 until the switching operation is initiated, is the smallest.

When on the other hand, the slide 20 is at the extreme left end of the leaf spring 16, the switching path is a maximum, since a certain flexure of the spring 16 and of the tongue 15a takes place, until the switching operation is initiated. In this manner it is possible to vary the switching cadence of the switch 7. In the first case the switch 7 responds e.g. to a temperature drop of 2° C. from the value adjusted to, while in the second case it responds only when the temperature drops e.g. 10° C. below the value adjusted to.

FIG. 2 shows a hollow body 1 corresponding to that according to FIG. 1, wherein the upper wall is formed by a soldered diaphragm 23, which is deformed elastically under the influence of the pressure in the interior of the hollow body 1 and which acts directly by means of the knob 23a on the member 8 (not shown in FIG. 2). In order to influence the spring characteristic of the diaphragm 23 in the sense of progressive stiffening with increasing outward deflection, a ring 24 is soldered to the circumference of the hollow body which has an abutment face 24a directed radially inward, the action of which corresponds to that of the faces 22a of FIG. 1.

According to FIG. 3, which shows a modification of the control member of FIG. 1, progressive stiffening of the elastic system formed by the bellows 9 and the leaf spring 10 may be effected by leaf springs 25, 26 additionally arranged in the frame 12, of which spring 25 comes into action at a predetermined temperature only, and the spring 26 at an even higher temperature. The three leaf springs may, for example, be arranged in such a manner, that in the control range of 40° to 70° C. the spring 10 only, in the control range of 70° to 100° C. the springs 10 and 25, and in the control range of 100° to 140° C. all three springs 10, 25, and 26 become effective.

While I have herein described and illustrated in the accompanying drawings what may be considered typical and particularly useful embodiments of my said invention, I wish it to be understood that I do not limit myself to the particular details or dimensions described or illustrated; obvious modifications will occur to a person skilled in the art.

What I claim as my invention and desire to secure by Letters Patent, is:

1. A control device for an electric heating apparatus, comprising a hollow body adapted to be evacuated and partly filled with a liquid, an electric heating coil located within said body and serving for the evaporation of the liquid, a resilient member, means connecting said resilient member with said hollow body, whereby said resilient member is elastically deformed in accordance with vapor pressure prevailing in the interior of said hollow body, a switch member, means connecting said switch member with said resilient member, means electrically connecting said switch member with said heating coil, whereby the supply of current to said heating coil is switched on and off according to the degree of deformation of the resilient member, a leaf spring supporting said resilient member, said leaf spring resting on both its ends and having two support points, guide cams located at said two support points and having curved abutment faces for said leaf spring, whereby upon flexure of said leaf spring caused by expansion of said resilient member said guide cams effect a shortening of the effective length of the spring by displacing the support points thereof so that there is a progressive stiffening of the resilient member with increasing pressure in the interior of the hollow body such as to cause the spring characteristic to follow the characteristic of the change of vapor pressure with temperature.

2. A control device according to claim 1, comprising a stem serving for the adjustment of the controlled temperature, a leaf spring engaging said stem, a movable slide having a cam and carried by the last-mentioned leaf spring, and a tongue adapted to be actuated by said cam, said switch having an actuating knob engaged by said tongue.

References Cited by the Examiner

UNITED STATES PATENTS

| | | | |
|---|---|---|---|
| 1,934,958 | 11/1933 | White | 200—122 |
| 2,498,864 | 2/1950 | Root | 200—122 |
| 2,554,535 | 5/1955 | Long et al. | 200—122 |
| 2,862,093 | 11/1958 | Lennox | 200—122 |
| 2,944,558 | 7/1960 | Dodge | 200—81.9 X |

FOREIGN PATENTS

| | | |
|---|---|---|
| 136,147 | 1/1950 | Australia. |
| 200,104 | 7/1954 | Australia. |
| 348,992 | 9/1960 | Switzerland. |

BERNARD A. GILHEANY, *Primary Examiner.*

L. A. WRIGHE, *Assistant Examiner.*